United States Patent
Li

(10) Patent No.: US 11,134,539 B2
(45) Date of Patent: Sep. 28, 2021

(54) AD-HOC NETWORK METHOD BASED ON VEHICLE-MOUNTED TERMINAL, AND VEHICLE-MOUNTED TERMINAL AND STORAGE MEDIUM

(71) Applicant: ZTE CORPORATION, Shenzhen (CN)

(72) Inventor: Mingyang Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 397 days.

(21) Appl. No.: 16/304,244

(22) PCT Filed: Nov. 10, 2016

(86) PCT No.: PCT/CN2016/105377
§ 371 (c)(1),
(2) Date: Nov. 23, 2018

(87) PCT Pub. No.: WO2017/201979
PCT Pub. Date: Nov. 30, 2017

(65) Prior Publication Data
US 2020/0320883 A1   Oct. 8, 2020

(30) Foreign Application Priority Data
May 25, 2016 (CN) .......................... 201610355579.2

(51) Int. Cl.
*H04W 84/18* (2009.01)
*H04W 4/40* (2018.01)
(Continued)

(52) U.S. Cl.
CPC ............ *H04W 84/18* (2013.01); *H04W 4/02* (2013.01); *H04W 4/025* (2013.01); *H04W 4/027* (2013.01);
(Continued)

(58) Field of Classification Search
CPC ...... H04W 84/18; H04W 4/025; H04W 40/20; H04W 4/02; H04W 4/027; H04W 84/005;
(Continued)

(56) References Cited

U.S. PATENT DOCUMENTS

| 8,232,889 B2 * | 7/2012 | Radtchenko | .......... H04W 84/18 340/686.1 |
| 8,289,186 B2 * | 10/2012 | Osafune | .......... H04W 28/06 340/903 |

(Continued)

FOREIGN PATENT DOCUMENTS

| CN | 103281742 A | 9/2013 |
| CN | 104468290 A | 3/2015 |

(Continued)

OTHER PUBLICATIONS

International Search Report in international application No. PCT/CN2016/105377, dated Feb. 4, 2017, 3 pgs.

(Continued)

*Primary Examiner* — Dale W Hilgendorf

(57) ABSTRACT

Disclosed is an ad-hoc network method based on a vehicle-mounted terminal, comprising: a target vehicle-mounted terminal acquiring first physical state information about a target vehicle corresponding to the target vehicle-mounted terminal, wherein the first physical state information at least represents a moving state of the target vehicle and information about a position where the target vehicle is located; and the target vehicle-mounted terminal performing networking in a chain structure mode, at least based on the first physical state information about the target vehicle and taking the target vehicle-mounted terminal as a target node, so that the target node is connected to two adjacent nodes at most. Further disclosed are a vehicle-mounted terminal and a storage medium.

14 Claims, 5 Drawing Sheets

(51) Int. Cl.
  *H04W 4/46* (2018.01)
  *H04W 4/02* (2018.01)
  *H04W 84/00* (2009.01)
  *H04W 40/20* (2009.01)
  *G08G 1/00* (2006.01)
  *H04L 29/08* (2006.01)

(52) U.S. Cl.
  CPC ............... *H04W 4/40* (2018.02); *H04W 4/46* (2018.02); *H04W 40/20* (2013.01); *H04W 84/005* (2013.01); *G08G 1/22* (2013.01); *H04L 67/12* (2013.01)

(58) Field of Classification Search
  CPC .......... H04W 4/46; H04W 4/40; H04L 67/12; G08G 1/22
  See application file for complete search history.

(56) References Cited

U.S. PATENT DOCUMENTS

| | | | |
|---|---|---|---|
| 8,744,736 B2* | 6/2014 | Basnayake | H04W 4/48 701/119 |
| 9,467,838 B2* | 10/2016 | Beyer, Jr. | H04M 1/7243 |
| 9,554,322 B2* | 1/2017 | Huang | H04W 40/248 |
| 10,616,751 B1* | 4/2020 | Kanellakis et al. | H04W 84/18 340/686.1 |
| 2005/0002347 A1* | 1/2005 | Lee | G08G 1/096758 370/312 |
| 2005/0152318 A1 | 7/2005 | Elbatt et al. | |
| 2007/0032245 A1* | 2/2007 | Alapuranen | H04W 4/02 455/456.1 |
| 2008/0207244 A1* | 8/2008 | Roggero | G08G 1/161 455/522 |
| 2010/0254294 A1* | 10/2010 | Jerbi | H04L 12/189 370/312 |
| 2011/0134840 A1* | 6/2011 | Kim | H04W 40/20 370/328 |
| 2012/0323633 A1 | 12/2012 | Chowdhary | |
| 2013/0134730 A1 | 5/2013 | Ricci | |
| 2013/0135118 A1 | 5/2013 | Ricci | |
| 2013/0138591 A1 | 5/2013 | Ricci | |
| 2013/0138714 A1 | 5/2013 | Ricci | |
| 2013/0141247 A1 | 6/2013 | Ricci | |
| 2013/0141252 A1 | 6/2013 | Ricci | |
| 2013/0143495 A1* | 6/2013 | Ricci | G06F 3/0488 455/41.2 |
| 2013/0143546 A1 | 6/2013 | Ricci | |
| 2013/0143601 A1 | 6/2013 | Ricci | |
| 2013/0144459 A1 | 6/2013 | Ricci | |
| 2013/0144460 A1 | 6/2013 | Ricci | |
| 2013/0144461 A1 | 6/2013 | Ricci | |
| 2013/0144462 A1 | 6/2013 | Ricci | |
| 2013/0144463 A1 | 6/2013 | Ricci et al. | |
| 2013/0144469 A1 | 6/2013 | Ricci | |
| 2013/0144470 A1 | 6/2013 | Ricci | |
| 2013/0144474 A1 | 6/2013 | Ricci | |
| 2013/0144486 A1 | 6/2013 | Ricci | |
| 2013/0144520 A1 | 6/2013 | Ricci | |
| 2013/0144657 A1 | 6/2013 | Ricci | |
| 2013/0145065 A1 | 6/2013 | Ricci | |
| 2013/0145279 A1 | 6/2013 | Ricci | |
| 2013/0145297 A1 | 6/2013 | Ricci et al. | |
| 2013/0145360 A1 | 6/2013 | Ricci | |
| 2013/0145401 A1 | 6/2013 | Ricci | |
| 2013/0145482 A1 | 6/2013 | Ricci et al. | |
| 2013/0147638 A1 | 6/2013 | Ricci | |
| 2013/0151031 A1 | 6/2013 | Ricci | |
| 2013/0151065 A1 | 6/2013 | Ricci | |
| 2013/0152003 A1 | 6/2013 | Ricci et al. | |
| 2013/0158821 A1 | 6/2013 | Ricci | |
| 2013/0159206 A1 | 6/2013 | Barahona | |
| 2013/0166097 A1 | 6/2013 | Ricci | |
| 2013/0167159 A1 | 6/2013 | Ricci et al. | |
| 2013/0231800 A1 | 9/2013 | Ricci | |
| 2014/0091949 A1* | 4/2014 | Tickoo | G01C 21/3492 340/905 |
| 2015/0012152 A1 | 1/2015 | Ricci | |
| 2015/0048641 A1 | 2/2015 | Ricci | |
| 2015/0097798 A1 | 4/2015 | Ricci | |
| 2015/0163720 A1* | 6/2015 | Cordeiro De Oliveria Barros | H04W 40/246 370/254 |
| 2015/0193007 A1 | 7/2015 | Ricci | |
| 2016/0021178 A1* | 1/2016 | Liu | H04L 41/06 370/216 |
| 2016/0055747 A1 | 2/2016 | Ricci | |
| 2016/0062583 A1 | 3/2016 | Ricci | |
| 2016/0070456 A1 | 3/2016 | Ricci et al. | |
| 2016/0103980 A1 | 4/2016 | Ricci et al. | |
| 2016/0127887 A1 | 5/2016 | Ricci | |
| 2016/0140776 A1 | 5/2016 | Ricci | |
| 2016/0188190 A1 | 6/2016 | Ricci et al. | |
| 2016/0255408 A1 | 9/2016 | Ricci | |
| 2016/0295589 A1* | 10/2016 | Nikopour | H04W 4/023 |
| 2016/0306615 A1 | 10/2016 | Ricci | |
| 2016/0314538 A1 | 10/2016 | Ricci | |
| 2017/0068438 A1 | 3/2017 | Ricci | |
| 2017/0093643 A1 | 3/2017 | Ricci et al. | |
| 2017/0132917 A1 | 5/2017 | Ricci | |
| 2017/0188355 A1 | 6/2017 | Ma | |
| 2017/0250525 A1 | 8/2017 | Ricci | |
| 2018/0091243 A1* | 3/2018 | Xu et al. | H04W 40/20 370/328 |
| 2018/0132285 A1* | 5/2018 | Jackson | G08G 1/0955 |

FOREIGN PATENT DOCUMENTS

| | | | |
|---|---|---|---|
| WO | 2013074868 A1 | 5/2013 | |
| WO | WO-2013101183 A1 * | 7/2013 | ....... G08G 1/096716 |
| WO | 2016041359 A1 | 3/2016 | |

OTHER PUBLICATIONS

English Translation of the Written Opinion of the International Search Authority in international application No. PCT/CN2016/105377, dated Feb. 4, 2017, 4 pgs.

Supplementary European Search Report in European application No. 16902963.4, dated Mar. 14, 2019, 11 pgs.

"Research on the MAC Layer and Related Technology of Wireless AD Hoc Networks", Dec. 2013, Jingrong Wen, Electronic Technology & Information Science, China Doctoral Dissertations Full Text Database, 137 pgs.

Examination Report of Counterpart European Patent Application No. 16902963.4 dated Jul. 3, 2020.

* cited by examiner

AD-HOC NETWORK METHOD BASED ON VEHICLE-MOUNTED TERMINAL, AND VEHICLE-MOUNTED TERMINAL AND STORAGE MEDIUM

TECHNICAL FIELD

The disclosure relates to mobile ad hoc (Ad Hoc) network technologies, and in particular to an ad-hoc networking method based on an in-vehicle terminal, an in-vehicle terminal, and a storage medium.

BACKGROUND

When a vehicle travels to a road section with poor mobile Internet signal quantity, for example, a mountainous area, a tunnel, or a cross-sea bridge, once a vehicle accident occurs, or congestion occurs due to any other reasons, the vehicle is usually not effectively directed and rescued, so that rescue or self-rescue cannot be performed effectively. In this case, the foregoing situations can be better dealt with if vehicles have a communication function of fast networking.

At present, a current in-vehicle terminal is usually networked by using an ad hoc networking manner of the vehicular ad-hoc network (VANET, Vehicular ad-hoc network) 802.11p. In this manner, a route is driven by using a Destination-Sequenced Distance-Vector Routing protocol (DSDV, Destination-Sequenced Distance-Vector Routing) table. However, in the existing ad hoc networking manner in which the route is driven by using the DSVR protocol table, there are relatively large overheads and a relatively high data delay. In addition, temporary networking may be performed based on a requirement in an on-demand networking manner, such as the Dynamic Source Routing protocol (DSR, Dynamic Source Routing), the Ad hoc On-demand Distance Vector Routing protocol (AODV, Ad hoc On-demand Distance Vector Routing), and a temporally ordered routing algorithm (TORA, Temporally Ordered Routing Algorithm), but a networking structure generated in the on-demand networking manner is usually a relatively complex tree structure or topological structure, and the tree structure or the topological structure includes a subnet and a subnet gateway. In this case, a data packet needs to be transmitted through the subnet and the subnet gateway. Therefore, a transmission process is relatively complex, there are a relatively large number of times of route determining, and network overheads are relatively large. In addition, inflexible and slow networking is caused due to a complex topology structure. As a result, a networking delay is relatively long, and the networking structure cannot be updated in time with a structure change of an actual node. Therefore, a method is urgently needed to resolve the existing problem in the existing ad hoc networking manner.

SUMMARY

To resolve an existing technical problem, embodiments of the disclosure provide an ad-hoc networking method based on an in-vehicle terminal, an in-vehicle terminal, and a storage medium, so as to resolve at least the existing problem in the related art.

To achieve the above objective, the embodiments of the disclosure provide the following technical solutions.

A first aspect of the embodiments of the disclosure provides an ad hoc networking method based on an in-vehicle terminal, the method includes that:

a target in-vehicle terminal obtains first physical status information of a target vehicle corresponding to the target in-vehicle terminal, the first physical status information being used for indicating at least a moving status of the target vehicle and position information of the target vehicle; and the target in-vehicle terminal performs an operation related to networking in a chain structure based on at least the first physical status information of the target vehicle by using the target in-vehicle terminal as a target node, so as to connect the target node to no more than two adjacent nodes.

In the above solution, the operation of performing, by the target in-vehicle terminal, the operation related to networking in a chain structure based on at least the first physical status information of the target vehicle by using the target in-vehicle terminal as a target node may include that:

whether the moving status indicated by the first physical status information satisfies a first preset rule is determined;

when it is determined that the moving status indicated by the first physical status information does not satisfy the first preset rule, the target in-vehicle terminal determines whether a first broadcast message from an Internet of Vehicles exists; and when the first broadcast message from an Internet of Vehicles exists, the target in-vehicle terminal joins the Internet of Vehicles in the chain structure according to the first physical status information by using the target in-vehicle terminal as the target node; or when no first broadcast message from the Internet of Vehicles exists, the target in-vehicle terminal establishes the Internet of Vehicles in the chain structure based on the first physical status information by using the target in-vehicle terminal as the target node.

In the above solution, the operation of joining, by the target in-vehicle terminal, the Internet of Vehicles in the chain structure according to the first physical status information by using the target in-vehicle terminal as the target node may include that:

the target in-vehicle terminal obtains at least two pieces of second physical status information corresponding to the Internet of Vehicles, the at least two pieces of second physical status information being used for indicating physical status information of at least two first vehicles corresponding to at least two first in-vehicle terminals in the Internet of Vehicles, respectively;

a first relative position relationship between the target vehicle and the at least two first vehicles is determined according to the at least two pieces of second physical status information and the first physical status information;

a target position corresponding to the target in-vehicle terminal in the Internet of Vehicles is determined according to the first relative position relationship between the target vehicle and the at least two first vehicles when the target in-vehicle terminal is acted as the target node, so as to connect the target node to no more than two target first nodes, the two target first nodes are nodes, in the Internet of Vehicles, corresponding to two target first in-vehicle terminals of the at least two first in-vehicle terminals; and the target node is connected to the Internet of Vehicles according to the target position.

In the above solution, the operation of connecting the target node to no more than two target first nodes may include that:

when it is determined, according to the first relative position relationship between the target vehicle and the at least two first vehicles, that the target node is a head node or a tail node in the Internet of Vehicles, the target node is controlled to be connected to a target first node, so that the Internet of Vehicles to which the target node has been connected has a chain structure; or when it is determined, according to the first relative position relationship between the target vehicle and the at least two first vehicles, that the target node is neither a head node nor a tail node in the Internet of Vehicles, the target node is connected to be connected to the two target first nodes, so that the Internet of Vehicles to which the target node has been connected has a chain structure.

In the above solution, the operation of establishing, by the target in-vehicle terminal, the Internet of Vehicles in the chain structure based on the first physical status information by using the target in-vehicle terminal as the target node may include that:

at least two second broadcast messages broadcast by at least two second in-vehicle terminals are received respectively;

at least two pieces of third physical status information are obtained from the at least two second broadcast messages respectively, the at least two pieces of third physical status information being of at least two second vehicles corresponding to the at least two second in-vehicle terminals respectively;

a second relative position relationship between the target vehicle and the at least two second vehicles is determined according to the first physical status information and the at least two pieces of third physical status information; and the Internet of Vehicles is established according to the second relative position relationship between the target vehicle and the at least two second vehicles, so as to connect the target node to no more than two target second nodes, the two target second nodes are nodes, in the Internet of Vehicles, corresponding to two target second in-vehicle terminals of the at least two second in-vehicle terminals.

In the above solution, the operation of connecting the target node to no more than two target second nodes may include that:

when it is determined, according to the second relative position relationship between the target vehicle and the at least two second vehicles, that the target node is a head node or a tail node in the established Internet of Vehicles, the target node is controlled to be connected to a target second node, so that the established Internet of Vehicles has a chain structure; or when it is determined, according to the second relative position relationship between the target vehicle and the at least two second vehicles, that the target node is neither a head node nor a tail node in the established Internet of Vehicles, the target node is controlled to be connected to the two target second nodes, so that the established Internet of Vehicles has a chain structure.

In the above solution, the method further includes the following operations:

the target in-vehicle terminal obtains fourth physical status information of the target vehicle corresponding to the target in-vehicle terminal;

whether a moving status of the target vehicle indicated by the fourth physical status information satisfies a second preset rule is determined; and when the moving status of the target vehicle indicated by the fourth physical status information satisfies the second preset rule, the target node corresponding to the in-vehicle terminal is removed from the Internet of Vehicles.

A second aspect of the embodiments of the disclosure provides an in-vehicle terminal, the in-vehicle terminal includes that an obtaining unit and a processing unit.

The obtaining unit is configured to obtain first physical status information of a target vehicle corresponding to the target in-vehicle terminal, the first physical status information being used for indicating at least a moving status of the target vehicle and position information of the target vehicle.

The processing unit is configured to perform an operation related to networking in a chain structure based on at least the first physical status information of the target vehicle by using the target in-vehicle terminal as a target node, so as to connect the target node to no more than two adjacent nodes.

In the above solution, the processing unit is further configured to:

determine whether the moving status indicated by the first physical status information satisfies a first preset rule;

when it is determined that the moving status indicated by the first physical status information does not satisfy the first preset rule, determine, by the target in-vehicle terminal, whether a first broadcast message from an Internet of Vehicles exists; and when the first broadcast message from the Internet of Vehicles exists, join, by the target in-vehicle terminal, the Internet of Vehicles in the chain structure according to the first physical status information by using the target in-vehicle terminal as the target node; or when no first broadcast message from the Internet of Vehicles exists, establish, by the target in-vehicle terminal, the Internet of Vehicles in the chain structure based on the first physical status information by using the target in-vehicle terminal as the target node.

In the above solution, the processing unit is further configured to:

obtain at least two pieces of second physical status information corresponding to the Internet of Vehicles, the at least two pieces of second physical status information being used for indicating physical status information of at least two first vehicles corresponding to at least two first in-vehicle terminals in the Internet of Vehicles, respectively;

determine a first relative position relationship between the target vehicle and the at least two first vehicles according to the at least two pieces of second physical status information and the first physical status information;

determine, according to the first relative position relationship between the target vehicle and the at least two first vehicles, a target location corresponding to the target in-vehicle terminal in the Internet of Vehicles when the target in-vehicle terminal is acted as the target node, to connect the target node to no more than two target first nodes, the two target first nodes being nodes, in the Internet of Vehicles, corresponding to two target first in-vehicle terminals of the at least two first in-vehicle terminals; and connect the target node to the Internet of Vehicles according to the target position.

In the above solution, the processing unit is further configured to:

when it is determined, according to the first relative position relationship between the target vehicle and the at least two first vehicles, that the target node is a head node or a tail node in the Internet of Vehicles, control the target node to be connected to a target first node, so that the Internet of Vehicles to which the target node has been connected has a chain structure; or when it is determined, according to the first relative position relationship between the target vehicle and the at least two first vehicles, that the target node is neither a head node nor a tail node in the Internet of Vehicles, control the target node to be connected to the two target first nodes, so that the Internet of Vehicles to which the target node has been connected has a chain structure.

In the above solution, the processing unit is further configured to:

receive at least two second broadcast messages broadcast by at least two second in-vehicle terminals respectively;

obtain at least two pieces of third physical status information, from the at least two second broadcast messages respectively, the at least two pieces of third physical status information being of at least two second vehicles corresponding to the at least two second in-vehicle terminals respectively;

determine a second relative position relationship between the target vehicle and the at least two second vehicles according to the first physical status information and the at least two pieces of third physical status information; and establish the Internet of Vehicles according to the second relative position relationship between the target vehicle and the at least two second vehicles, to connect the target node to no more than two target second nodes, the two target second nodes being nodes, in the Internet of Vehicles, corresponding to two target second in-vehicle terminals of the at least two second in-vehicle terminals.

In the above solution, the processing unit is further configured to:

when it is determined, according to the second relative position relationship between the target vehicle and the at least two second vehicles, that the target node is a head node or a tail node in the established Internet of Vehicles, control the target node to be connected to a target second node, so that the established Internet of Vehicles has a chain structure; or when it is determined, according to the second relative position relationship between the target vehicle and the at least two second vehicles, that the target node is neither a head node nor a tail node in the established Internet of Vehicles, control the target node to be connected to the two target second nodes, so that the established Internet of Vehicles has a chain structure.

In the above solution, the obtaining unit is further configured to obtain fourth physical status information of the target vehicle corresponding to the target in-vehicle terminal; and the processing unit is further configured to detect whether a moving status of the target vehicle indicated by the fourth physical status information satisfies a second preset rule; and when the moving status of the target vehicle indicated by the fourth physical status information satisfies the second preset rule, remove the target node corresponding to the target in-vehicle terminal from the Internet of Vehicles.

A third aspect of the embodiments of the disclosure provides a computer storage medium, the computer storage medium stores a computer program, and the computer program being used for performing the above-mentioned ad-hoc networking method based on an in-vehicle terminal.

According to the ad-hoc networking method based on the in-vehicle terminal, the in-vehicle terminal, and the storage medium that are provided in the embodiments of the disclosure, a target in-vehicle terminal obtains first physical status information of a target vehicle corresponding to the target in-vehicle terminal, and then performs an operation related to networking in a chain structure based on at least the first physical status information of the target vehicle by using the target in-vehicle terminal as a target node, to connect the target node to no more than two adjacent nodes. In this way, a networking structure of an Internet of Vehicles can be updated in time according to a structure change of an actual node, a networking delay is reduced, and user experience is improved. In addition, because the Internet of Vehicles in the embodiments of the disclosure has a chain structure, a network structure is relatively simple, and therefore network overheads are reduced, and networking efficiency is improved.

BRIEF DESCRIPTION OF THE DRAWINGS

In the accompanying drawings (it is not necessarily drawn to scale), similar reference numbers in the accompanying drawings are intended to describe similar components in different views. Similar reference numbers with different suffix letters can represent different examples of similar components. The accompanying drawings mainly show, by using examples rather than a limitation manner, embodiments discussed in this specification.

DETAILED DESCRIPTION

In various embodiments of the disclosure: a target in-vehicle terminal obtains first physical status information of a target vehicle corresponding to the target in-vehicle terminal, where the first physical status information is used for indicating at least a moving status of the target vehicle and position information of the target vehicle; and the target in-vehicle terminal performs an operation related to networking in a chain structure based on at least the first physical status information of the target vehicle by using the target in-vehicle terminal as a target node, so as to connect the target node to no more than two adjacent nodes. In this way, the established Internet of Vehicles has a chain structure. According to the embodiments of the disclosure, the networking structure of the Internet of Vehicles can be updated in time according to a structure change of an actual node, a networking delay is reduced, and user experience is improved.

First Embodiment

Figure 1:
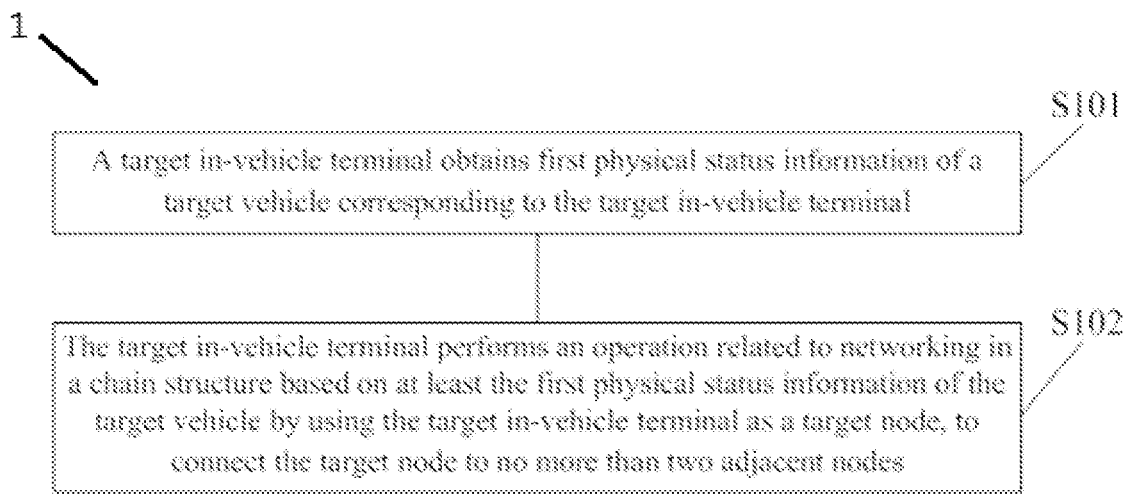
FIG. 1 is a schematic diagram 1 of an implementation process of an ad-hoc networking method based on an in-vehicle terminal according to an embodiment of the disclosure.

FIG. 1 is a schematic diagram 1 of an implementation process of an ad-hoc networking method based on an in-vehicle terminal according to an embodiment of the disclosure. The method is applied to an in-vehicle terminal, such as vehicle navigation. As shown in FIG. 1, the method includes the following operations.

At S101: a target in-vehicle terminal obtains first physical status information of a target vehicle corresponding to the target in-vehicle terminal.

In this embodiment, the first physical status information indicates at least a moving status of the target vehicle and position information of the target vehicle. Specifically, the first physical status information may indicate a moving direction, a speed, and an acceleration of a vehicle and a geographic position of the vehicle, such as a longitude and latitude.

At S102: the target in-vehicle terminal performs an operation related to networking in a chain structure based on at least the first physical status information of the target vehicle by using the target in-vehicle terminal as a target node, so as to connect the target node to no more than two adjacent nodes.

In an embodiment, the target in-vehicle terminal further needs to obtain the first physical status information of the target vehicle corresponding to the target in-vehicle terminal; determine whether a moving status indicated by the first physical status information satisfies a first preset rule; when it is determined that the moving status indicated by the first physical status information does not satisfy the first preset rule, the target in-vehicle terminal determines whether a first broadcast message from an Internet of Vehicles exists, so as to determine to join the Internet of Vehicles or establish an Internet of Vehicles. Specifically, when a determining result indicates that there is a first broadcast message from an Internet of Vehicles, the target in-vehicle terminal joins the Internet of Vehicles in a chain structure based on the first physical status information by using the target in-vehicle terminal as the target node, to connect the target node to no more than two adjacent nodes. Or when a determining result indicates that there is no first broadcast message from an Internet of Vehicles, the target in-vehicle terminal establishes an Internet of Vehicles in a chain structure based on the first physical status information by using the target in-vehicle terminal as the target node, to connect the target node to no more than two adjacent nodes. In this way, because the joined Internet of Vehicles or the established Internet of Vehicles has a chain structure, a networking structure of the Internet of Vehicles in the embodiments of the disclosure can be updated in time according to a structure change of an actual node, a networking delay is reduced, and user experience is improved.

Figure 2:
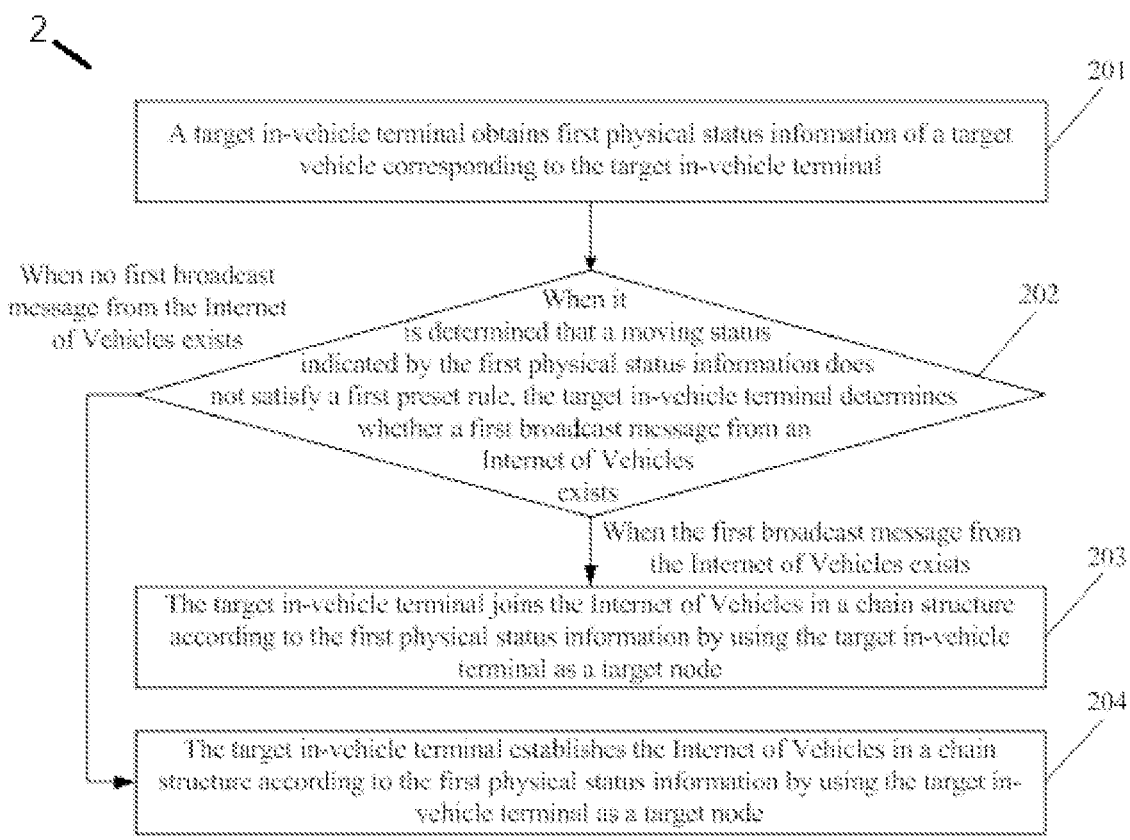
FIG. 2 is a schematic diagram 2 of an implementation process of an ad-hoc networking method based on an in-vehicle terminal according to an embodiment of the disclosure.
Figure 3:
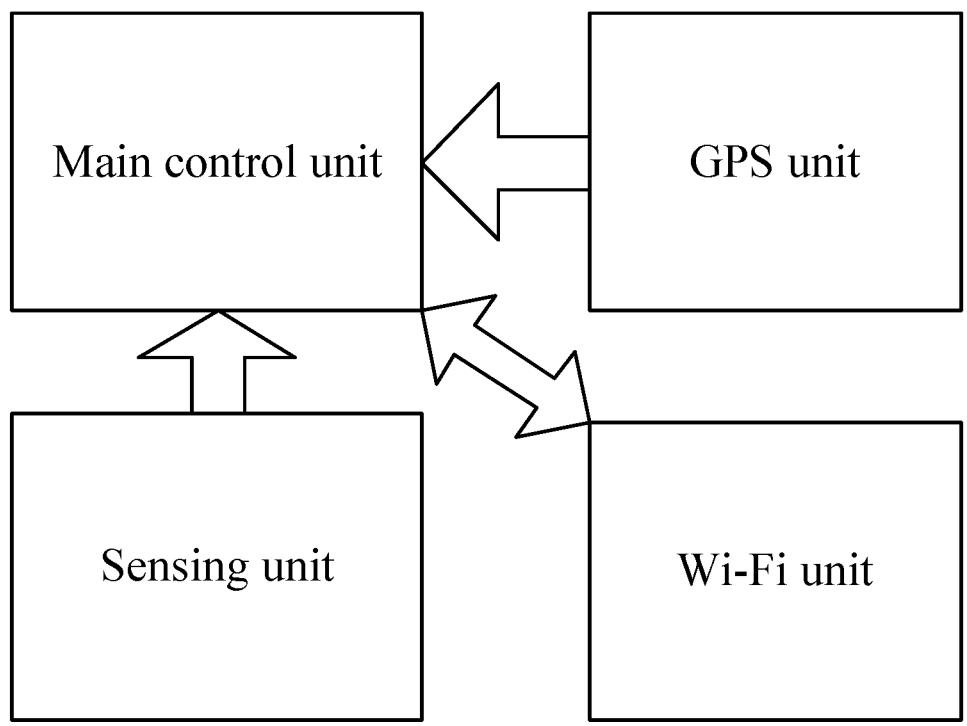
FIG. 3 is a schematic structural diagram of four types of functional units in an in-vehicle terminal according to an embodiment of the disclosure.

In another embodiment, as shown in FIG. 3, the in-vehicle terminal may specifically include four types of functional units, for example, a main control unit, a wireless fidelity (Wi-Fi) unit, a sensing unit, and a Global Positioning System (GPS) unit. The Wi-Fi unit is configured to establish an Ad Hoc network of Wi-Fi 802.11p, further configured to receive a Wi-Fi broadcast from another in-vehicle terminal, and establish a wireless connection with the another in-vehicle terminal. The GPS unit is configured to communicate with a satellite, so as to complete a query of a geographic position of the in-vehicle terminal in which the GPS unit is located, such as a longitude and latitude. The sensing unit is configured to obtain a moving status of a vehicle corresponding to the current in-vehicle terminal, such as a moving speed, a moving acceleration, and a moving direction. The main control unit is configured to perform centralized control and management on data corresponding to the Wi-Fi unit, the sensing unit, and the GPS unit. Herein, a person skilled in the art should understand that, division of the foregoing units is an example, and may be another division manner in an actual application. As shown in FIG. 2, a method in an embodiment includes the following operations.

At S-201: a target in-vehicle terminal obtains first physical status information of a target vehicle corresponding to the target in-vehicle terminal.

In this embodiment, the first physical status information may specifically indicate a moving direction, a speed, and an acceleration of the vehicle and a geographic position of the vehicle, such as a longitude and latitude.

At 202: when it is determined that a moving status indicated by the first physical status information does not satisfy a first preset rule, the target in-vehicle terminal determines whether a first broadcast message from an Internet of Vehicles exists; and when the first broadcast message form the Internet of Vehicles exists, operation 203 is performed; otherwise, operation 204 is performed.

In an actual application, when the target in-vehicle terminal determines that at least one of a speed or an acceleration indicated by the first physical status information is zero, or is less than a preset threshold, the target in-vehicle terminal enters an ad-hoc network search or establishment mode. In the ad-hoc network search or establishment mode, the target in-vehicle terminal broadcasts a target broadcast message around, where the target broadcast message carries the first physical status information corresponding to the target in-vehicle terminal, so that another in-vehicle terminal learns of the status of the target in-vehicle terminal, and further, an established Internet of Vehicles is adjusted, or a new Internet of Vehicles is established.

Further, in the ad-hoc network search or establishment mode, the target in-vehicle terminal determines whether a first broadcast message from an Internet of Vehicles established by another in-vehicle terminal exists around the target in-vehicle terminal, and then determines whether the target in-vehicle terminal joins the Internet of Vehicles or establishes an Internet of Vehicles.

At 203: when the first broadcast message from an Internet of Vehicles exists, the target in-vehicle terminal connects to the Internet of Vehicles in a chain structure according to the first physical status information by using the target in-vehicle terminal as a target node.

In this embodiment, when the target in-vehicle terminal determines that there is a first broadcast message broadcast by another in-vehicle terminal, the target in-vehicle terminal obtains at least two pieces of second physical status information corresponding to the Internet of Vehicles (in which the another in-vehicle terminal is located), where the at least two pieces of second physical status information indicate physical status information of at least two first vehicles corresponding to at least two first in-vehicle terminals in the Internet of Vehicles, respectively, determines a first relative position relationship between the target vehicle and the at least two first vehicles according to the at least two pieces of second physical status information and the first physical status information, and then determines, according to the first relative position relationship between the target vehicle and the at least two first vehicles, a target position corresponding to the target in-vehicle terminal in the Internet of Vehicles when the target in-vehicle terminal is acted as the target node, so as to connect the target node to no more than two target first nodes, where the two target first nodes are nodes, in the Internet of Vehicles, corresponding to two target first in-vehicle terminals of the at least two first in-vehicle terminals, to finally join the target node to the Internet of Vehicles according to the target position.

Herein, the first relative position relationship may specifically indicate a relative position in a first direction (such as a y-axis direction), or relative positions in the first direction (such as the y-axis direction) and a second direction (such as an x-axis direction), or a relative position determined based on signal strength. The y-axis direction may be specifically a vehicle moving direction, and the x-axis direction is a direction perpendicular to the Y-axis direction. Certainly, in an actual application, the relative position may be arbitrarily set according to an actual demand.

In an embodiment, the operation of connecting the target node to no more than two target first nodes may include the following actions.

When it is determined, according to the first relative position relationship between the target vehicle and the at least two first vehicles, that the target node is a head node or a tail node in the Internet of Vehicles, the target node is controlled to be connected to a target first node, so that the Internet of Vehicles to which the target node has been connected has a chain structure, that is, the target node is controlled to connect to the Internet of Vehicles in a series manner.

Or, when it is determined, according to the first relative position relationship between the target vehicle and the at least two first vehicles, that the target node is neither a head node nor a tail node in the Internet of Vehicles, in other words, the target node is an intermediate node, the target node is controlled to be connected to the two target first nodes, so that the Internet of Vehicles to which the target node has been connected has a chain structure, that is, the target node is controlled to be connected to the Internet of Vehicles in a series manner. In this way, the Internet of Vehicles has a simple chain structure, that is, a node can only be connected to at least one of a previous node or a next node corresponding to the node, and can only transmit data with at least one of the previous node or the next node to which the node has been connected. Therefore, when it is ensured that a networking structure of the Internet of Vehicles is updated in time according to a structure change of an actual node, a delay is reduced, and user experience is improved.

In an embodiment, after the target in-vehicle terminal receives first broadcast messages broadcast by a plurality of in-vehicle terminals around the target in-vehicle terminal, certainly, the plurality of first broadcast messages may correspond to different Internets of Vehicles, or may correspond to a same Internet of Vehicles. Specifically, when the plurality of first broadcast messages correspond to different Internets of Vehicles, the target in-vehicle terminal further needs to compare signal strength corresponding to the target in-vehicle terminal with signal strengths corresponding to other in-vehicle terminals in the plurality of first broadcast messages, and compare the first physical status information corresponding to the target in-vehicle terminal with physical status information of other in-vehicle terminals in the plurality of first broadcast messages, and then determines an Internet of Vehicles corresponding to a first broadcast message in which signal strength is greater than a specific preset signal threshold and vehicle moving direction is as the same as or approximately the same as the moving direction of the target vehicle corresponding to the target in-vehicle terminal, to be a target Internet of Vehicles, so as to join to the target Internet of Vehicles. For example, the target in-vehicle terminal receives first broadcast messages of in-vehicle terminals corresponding to a plurality of lanes, and different lanes correspond to different Internets of vehicles, in this case, the target in-vehicle terminal may determine, according to signal strength, a first broadcast message sent by an in-vehicle terminal in a lane on which the in-vehicle terminal is located, to be a target first broadcast message, and then determines an Internet of Vehicles corresponding to the target first broadcast message to be a target Internet of Vehicles.

Further, the target in-vehicle terminal establishes a two dimensional coordinate system by using a same or an approximately same vehicle moving direction as a positive direction of a y-axis and using a direction perpendicular to the Y-axis as an X-axis; maps longitude and latitude information of the target in-vehicle terminal and longitude and latitude information of another corresponding in-vehicle terminal in the target Internet of Vehicles to the established two dimensional coordinate system; determines a position relationship between the target in-vehicle terminal and the another corresponding in-vehicle terminal in the target Internet of Vehicles according to the longitude and latitude information of the target in-vehicle terminal and the longitude and latitude information of the another corresponding in-vehicle terminal in the target Internet of Vehicles, for example, differences $\Delta X$ and $\Delta Y$. When $\Delta Y$ is positive, it indicates that a target vehicle corresponding to the target in-vehicle terminal is in the front of the another corresponding in-vehicle terminal in the target Internet of Vehicles, and when $\Delta X$ is positive, it indicates that a target vehicle corresponding to the target in-vehicle terminal is on the right of the another corresponding in-vehicle terminal in the target Internet of Vehicles; and then sequences, according to $\Delta X$ and $\Delta Y$, the target vehicle corresponding to the target in-vehicle terminal and vehicles corresponding to other in-vehicle terminals in the target Internet of Vehicles, where an in-vehicle terminal sequenced first is a first node of the target Internet of Vehicles, an in-vehicle terminal sequenced last is a last node of the target Internet of Vehicles, and each of other in-vehicle terminals in middle positions is only connected to two in-vehicle terminals closest to the in-vehicle terminal, so that the target Internet of Vehicles has a chain structure. In this case, the target in-vehicle terminal is joined to the target Internet of Vehicles in a series manner according to the target Internet of Vehicles having the foregoing chain structure. Herein, in an actual application, the target in-vehicle terminal records an identifier (ID) of each in-vehicle terminal in the target Internet of Vehicles, or may further record a connection relationship and may further record an ID corresponding to the target in-vehicle terminal and a connection relationship between the target in-vehicle terminal and another target in-vehicle terminal, and then carries the foregoing recorded information into a target broadcast message, so as to send the target broadcast message in a broadcast mode.

Further, when the plurality of first broadcast messages correspond to a same Internet of Vehicles, and a vehicle moving direction indicated by the plurality of in-vehicle terminals and a vehicle moving direction of the target in-vehicle terminal are the same or approximately the same, the target in-vehicle terminal determines the same Internet of Vehicles corresponding to the plurality of in-vehicle terminals to be a target Internet of Vehicles, and then joins to the target Internet of Vehicles.

In this way, it can be learned, from the foregoing manner of connecting the target in-vehicle terminal to the Internet of Vehicles, that a number of nodes in the Internet of vehicles increases one by one, a tail part of a chain can learn a specific number of nodes in the front of the chain, so that a user learns that a specific number of vehicles in front on which congestion occurs. Therefore, it is convenient for the user to change a moving track in time, and user experience is improved.

At 204: when no first broadcast message form an Internet of Vehicles exists, the target in-vehicle terminal establishes an Internet of Vehicles in a chain structure based on the first physical status information by using the target in-vehicle terminal as a target node.

In this embodiment, when the target in-vehicle terminal determines that there is no first broadcast message broadcast by another in-vehicle terminal, the target in-vehicle terminal receives at least two second broadcast messages broadcast by at least two second in-vehicle terminals respectively, obtains at least two pieces of third physical status information from the at least two second broadcast messages respectively, the at least two pieces of third physical status information being of at least two second vehicles corresponding to the at least two second in-vehicle terminals respectively, determines a second relative position relationship between the target vehicle and the at least two second vehicles according to the first physical status information and the at least two pieces of third physical status information, and then establishes the Internet of Vehicles according to the second relative position relationship between the target vehicle and the at least two second vehicles, to connect the target node to no more than two target second nodes. Here, the two target second nodes are nodes, in the Internet of Vehicles, corresponding to two target second in-vehicle terminals of the at least two second in-vehicle terminals.

Herein, the second relative position relationship may specifically indicate a relative position in a first direction (such as a y-axis direction), or relative positions in the first direction (such as the y-axis direction) and a second direction (such as an x-axis direction), or a relative position determined based on signal strength. Here, the y-axis direction may be specifically a vehicle moving direction, and the x-axis direction is a direction perpendicular to the Y-axis direction. Certainly, in an actual application, the relative position may be arbitrarily set according to an actual demand.

In an embodiment, the operation of connecting the target node to no more than two target second nodes may include the following actions.

When it is determined, according to the second relative position relationship between the target vehicle and the at least two second vehicles, that the target node is a head node or a tail node in the established Internet of Vehicles, the target node is controlled to be connected to a target second node, so that the established Internet of Vehicles has a chain structure, that is, the target in-vehicle terminal is controlled to establish an Internet of Vehicles in a series manner.

Or, when it is determined, according to the second relative position relationship between the target vehicle and the at least two second vehicles, that the target node is neither a head node nor a tail node in the established Internet of Vehicles, that is, it is an intermediate node, the target node is controlled to be connected to the two target second nodes, so that the established Internet of Vehicles has a chain structure, that is, the target in-vehicle terminal is controlled to establish an Internet of Vehicles in a series manner.

It should be noted that, a manner of establishing an Internet of Vehicles by the target in-vehicle terminal is similar to a manner of joining an Internet of Vehicles. The foregoing manners both include determining differences $\Delta X$ and $\Delta Y$ to determine a position of each in-vehicle terminal, and then establishing an Internet of Vehicles having a chain structure. Details are not repeated herein.

In this way, the Internet of Vehicles has a simple chain structure, that is, a node can only be connected to at least one of a previous node or a next node corresponding to the node, and can only transmit data with at least one of the previous node or the next node to which the node has been connected. Therefore, when it is ensured that a networking structure of the Internet of Vehicles is updated in time according to a structure change of an actual node, a delay is reduced, and user experience is improved.

Herein, it should be noted that, specific information indicated by the second physical status information or the third physical status information is similar to the specific information indicated by the first physical status information, and information carried in the second broadcast message is similar to the information carried in the first broadcast message.

According to the method in this embodiment of the disclosure, a networking structure of an Internet of Vehicles can be updated in time according to a structure change of an actual node, a networking delay is reduced, and user experience is improved. In addition, because the Internet of Vehicles in this embodiment of the disclosure has a chain structure, a network structure is relatively simple, and therefore network overheads are reduced, and networking efficiency is improved.

In addition, in the Internet of Vehicles according to this embodiment of the disclosure, each node can be only be connected to and perform data transmission with at least one of a previous node or a next node corresponding to the node, and data can be transmitted to a chain head and a chain tail sequentially in the foregoing transmission manner. In this case, according to this embodiment of the disclosure, each node can obtain information about the Internet of vehicles, and then obtain a real-time congestion status, without connecting to the network (Internet) for help. Therefore, compared with an existing manner of combining information about an Internet of vehicles and the Internet to obtain road condition information, this embodiment of the disclosure is simpler, and is more convenient for use in a road segment with low signal strength.

A computer storage medium is further provided in the embodiments of the disclosure, where the computer storage medium stores a computer program, and the computer program is used for performing the ad-hoc networking method based on an in-vehicle terminal according to the First embodiment.

Figure 4:
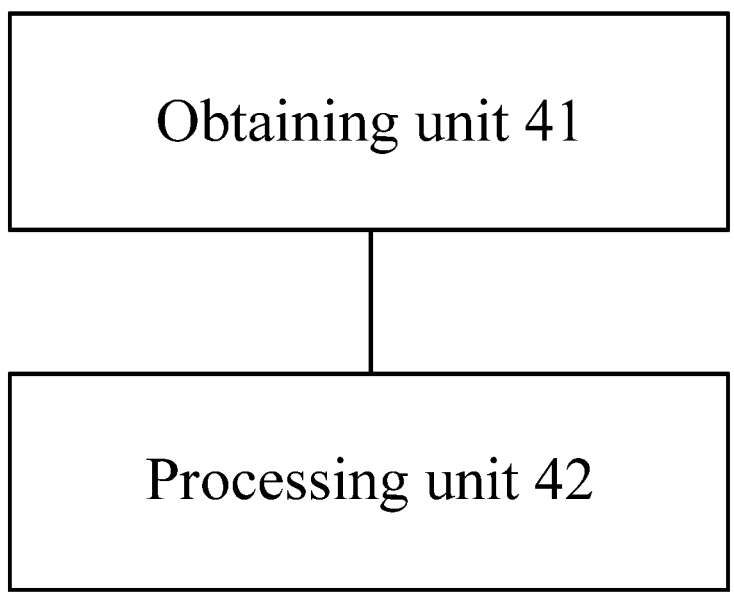
FIG. 4 is a schematic diagram of a specific structure, obtained based on another division manner, of an in-vehicle terminal according to an embodiment of the disclosure.

In the First embodiment provided in this application, it should be understood that function units of the described in-vehicle terminal are merely an example. For example, the unit division is merely logical function division and may be other division in actual implementation. For example, a plurality of units or components may be combined or integrated into another system, or some features may be ignored or not performed. On this basis, an embodiment of the disclosure further provides another division and combination manner Specifically, as shown in FIG. 4, the in-vehicle terminal includes an obtaining unit 41 and a processing unit 42.

The obtaining unit 41 is configured to obtain first physical status information of a target vehicle corresponding to the in-vehicle terminal, where the first physical status information indicates at least a moving status of the target vehicle and position information of the target vehicle.

The processing unit 42 is configured to perform an operation related to networking in a chain structure based on at least the first physical status information of the target vehicle by using the in-vehicle terminal as a target node, so as to connect the target node to no more than two adjacent nodes.

In an embodiment, the processing unit 42 is further configured to:

determine whether the moving status indicated by the first physical status information satisfies a first preset rule;

when it is determined that the moving status indicated by the first physical status information does not satisfy the first preset rule, determine whether a first broadcast message from an Internet of Vehicles exists; and when a determining result indicates that there is a first broadcast message from an Internet of Vehicles, the target in-vehicle terminal joins to the Internet of Vehicles in the chain structure according to the first physical status information by using the target in-vehicle terminal as the target node; or when a determining result indicates that there is no first broadcast message from the Internet of Vehicles, establish an Internet of Vehicles in the chain structure based on the first physical status information by using the target in-vehicle terminal as the target node.

In an embodiment, the processing unit 42 is further configured to:

obtain at least two pieces of second physical status information corresponding to the Internet of Vehicles, where the at least two pieces of second physical status information indicate physical status information of at least two first vehicles corresponding to at least two first in-vehicle terminals in the Internet of Vehicles, respectively;

determine a first relative position relationship between the target vehicle and the at least two first vehicles according to the at least two pieces of second physical status information and the first physical status information;

determine, according to the first relative position relationship between the target vehicle and the at least two first vehicles, a target location corresponding to the target in-vehicle terminal in the Internet of Vehicles when the target in-vehicle terminal is acted as the target node, so as to connect the target node to no more than two target first nodes, where the two target first nodes are nodes, in the Internet of Vehicles, corresponding to two target first in-vehicle terminals of the at least two first in-vehicle terminals; and join the target node to the Internet of Vehicles according to the target position.

In an embodiment, the processing unit 42 is further configured to:

when it is determined, according to the first relative position relationship between the target vehicle and the at least two first vehicles, that the target node is a head node or a tail node in the Internet of Vehicles, control the target node to be connected to a target first node, so that the Internet of Vehicles to which the target node has been connected has a chain structure; or when it is determined, according to the first relative position relationship between the target vehicle and the at least two first vehicles, that the target node is neither a head node nor a tail node in the Internet of Vehicles, control the target node to be connected to the two target first nodes, so that the Internet of Vehicles to which the target node has been connected has a chain structure.

In another embodiment, the processing unit 42 is further configured to:

receive at least two second broadcast messages broadcast by at least two second in-vehicle terminals respectively;

obtain at least two pieces of third physical status information from the at least two second broadcast messages respectively, the at least two pieces of third physical status information being of at least two second vehicles corresponding to the at least two second in-vehicle terminals respectively;

determine a second relative position relationship between the target vehicle and the at least two second vehicles according to the first physical status information and the at least two pieces of third physical status information; and establish an Internet of Vehicles according to the second relative position relationship between the target vehicle and the at least two second vehicles, so as to connect the target node to no more than two target second nodes, where the two target second nodes are nodes, in the Internet of Vehicles, corresponding to two target second in-vehicle terminals of the at least two second in-vehicle terminals.

In another embodiment, the processing unit 42 is further configured to:

when it is determined, according to the second relative position relationship between the target vehicle and the at least two second vehicles, that the target node is a head node or a tail node in the established Internet of Vehicles, control the target node to be connected to a target second node, so that the established Internet of Vehicles has a chain structure; or when it is determined, according to the second relative position relationship between the target vehicle and the at least two second vehicles, that the target node is neither a head node nor a tail node in the established Internet of Vehicles, control the target node to be connected to the two target second nodes, so that the established Internet of Vehicles has a chain structure.

In another embodiment, the obtaining unit 41 is further configured to obtain fourth physical status information (i.e., the current physical status information) of the target vehicle corresponding to the target in-vehicle terminal.

The processing unit 42 is further configured to detect whether a moving status of the target vehicle indicated by the fourth physical status information satisfies a second preset rule; and when the moving status of the target vehicle indicated by the fourth physical status information satisfies the second preset rule, remove the target node corresponding to the target in-vehicle terminal from the Internet of Vehicles.

A person skilled in the art should understand that, for functions of various processing units in the in-vehicle terminal according to this embodiment of the disclosure, refer to the relevant description of the method described in the First embodiment, and details are not repeated herein.

In an actual application, each of the obtaining unit 41 and the processing unit 42 may run on a computer, and may be implemented by a central processing unit (CPU), a microprocessor (MPU), a digital signal processor (DSP), or a field programmable gate array (FPGA) that is located on the computer.

Second Embodiment

Figure 5:
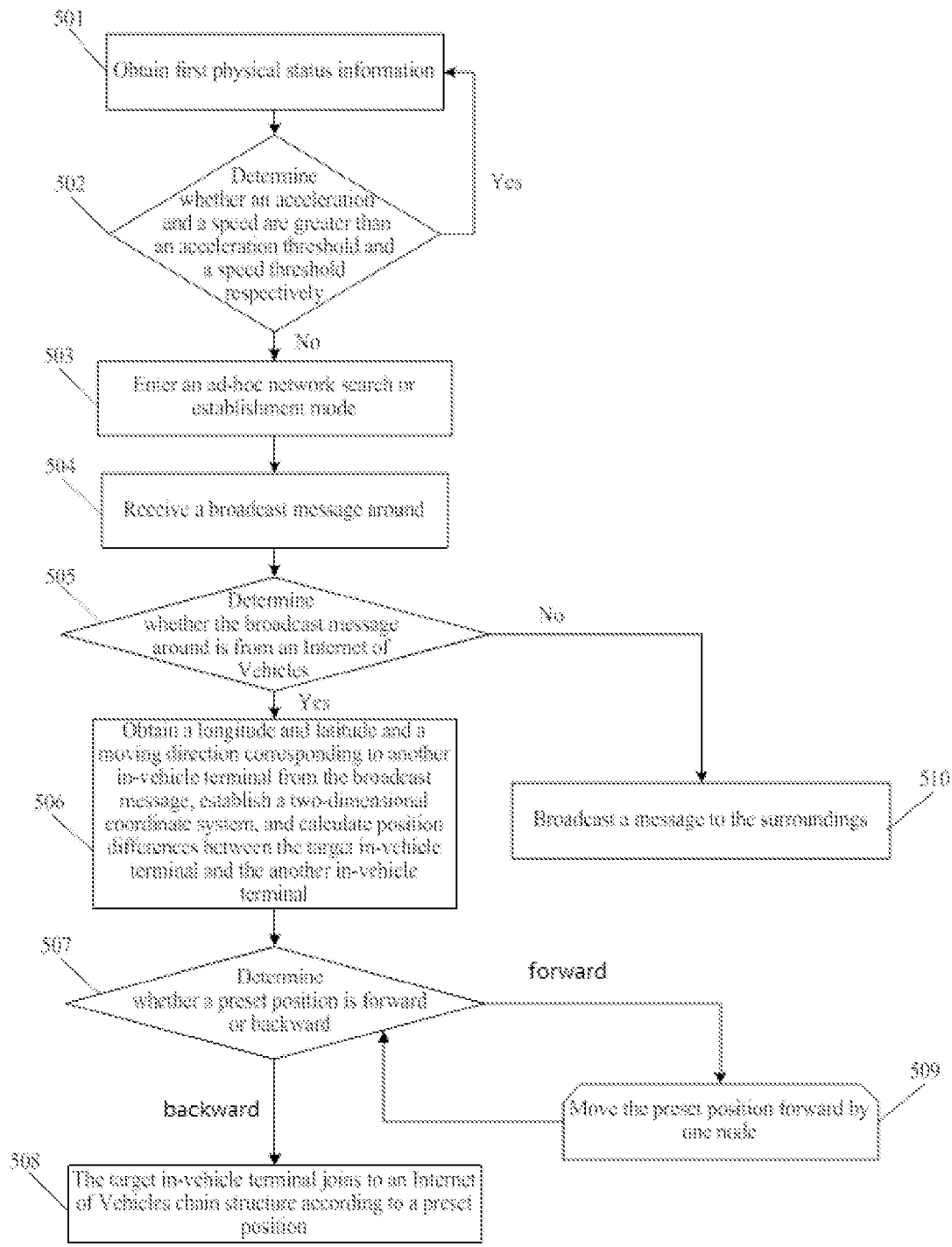
FIG. 5 is a schematic diagram of an implementation process of a series ad-hoc networking method based on geographic information and applied to an in-vehicle terminal according to an embodiment of the disclosure.

This embodiment of the disclosure provides an ad-hoc networking method based on an in-vehicle terminal. Specifically, this embodiment of the disclosure provides a series ad-hoc networking method applied to an in-vehicle terminal and based on geographic information. In this way, compared with an existing complex structure of an Internet of Vehicles, the method in this embodiment of the disclosure can reduce network overheads, and improve networking efficiency. As shown in FIG. 5, the method includes the following operations.

At 501: a target in-vehicle terminal obtains first physical status information of a target vehicle corresponding to the target in-vehicle terminal, such as a moving direction, speed, and acceleration and a longitude and latitude.

At 502: the target in-vehicle terminal determines whether the obtained acceleration is greater than an acceleration threshold and whether the obtained speed is greater than a speed threshold respectively; and when the obtained acceleration is greater than the acceleration threshold and the obtained speed is greater than the speed threshold, operation 501 is executed; otherwise, operation 503 is executed.

At 503: the target in-vehicle terminal enters an ad-hoc network search or establishment mode.

At 504: the target in-vehicle terminal receives a broadcast message around.

At 505: when it is determined that the broadcast message around is from an Internet of Vehicles, operation 506 is executed; otherwise, operation 510 is executed.

At 506: a longitude, a latitude, and a moving direction corresponding to another in-vehicle terminal is obtained from the broadcast message, and when it is determined that moving direction corresponding to the another in-vehicle terminal is as the same as or approximately the same as the moving direction of the target vehicle corresponding to the target in-vehicle terminal, a two dimensional coordinate system is established by using the same direction as a positive direction of a y-axis and a direction perpendicular to the y-axis as an x-axis, longitudes and latitudes corresponding to the target in-vehicle terminal and the another in-vehicle terminal are mapped respectively to the established two dimensional coordinate system, and position differences between the target in-vehicle terminal and the another in-vehicle terminal, namely $\Delta X$ and $\Delta Y$, are calculated.

At 507: a preset position is determined for the target in-vehicle terminal, and whether the preset position is forward or backward relative to the position of the another in-vehicle terminal is determined according to the position differences; and if the preset position is forward relative to the position of the another in-vehicle terminal (the preset position is in front of the another in-vehicle terminal), operation 509 is executed; otherwise, operation 508 is executed.

At 508: the target in-vehicle terminal joins to an Internet of Vehicles chain structure according to the preset position.

At 509: the preset position is moved forward by one node, and the operation 507 is executed, until the target in-vehicle terminal connects to a corresponding node of the Internet of Vehicles chain structure.

At 510: the target vehicle terminal broadcasts a message to the surroundings, where the message carries the first physical status information corresponding to the target in-vehicle terminal, such as the moving direction, speed, and acceleration and the longitude and latitude.

It should be noted that, in this embodiment, after the target in-vehicle terminal connects to the Internet of Vehicles chain structure, a data path is established. In this case, data transmission does not need to be performed by broadcasting a message, but only needs to perform transmission of data or a signaling message directly.

Third Embodiment

Figure 6:
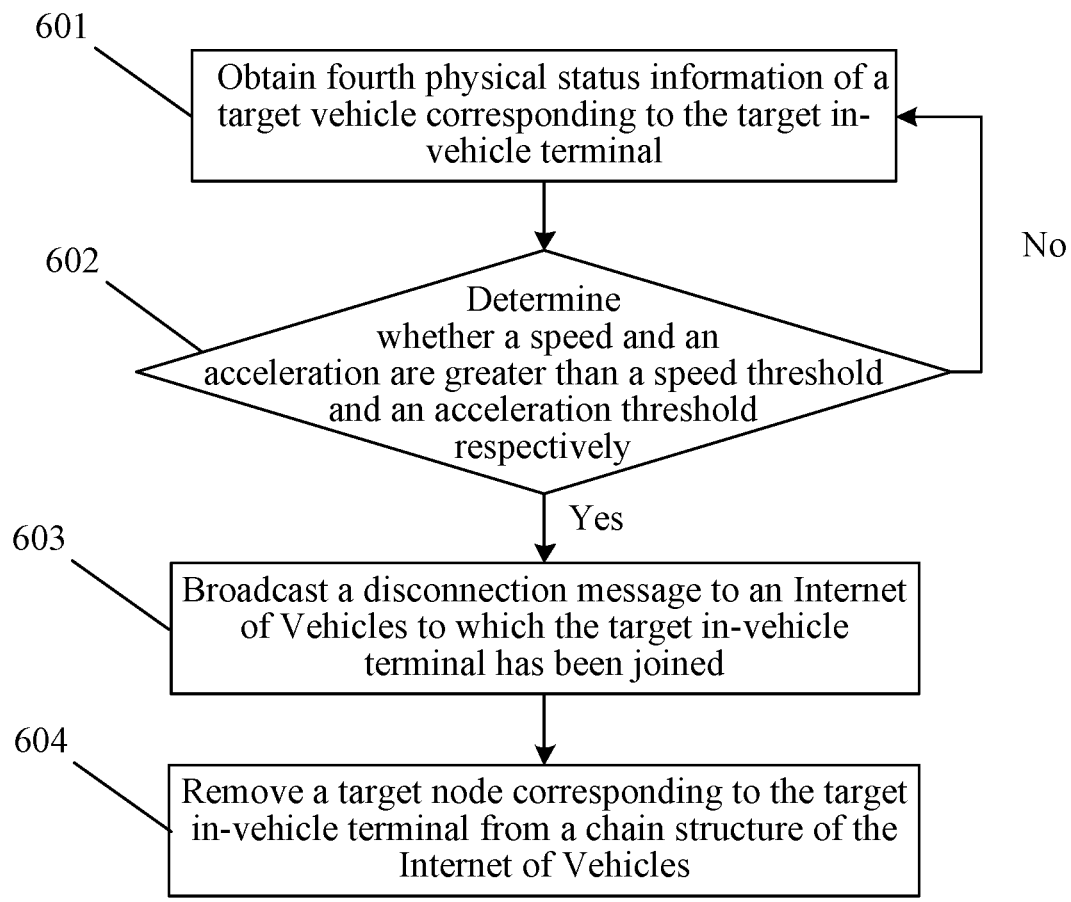
FIG. 6 is a schematic diagram of an implementation process of exiting an Internet of Vehicles according to an embodiment of the disclosure.

Based on the method in the First or second embodiment, to facilitate real-time adjustment of an Internet of vehicles according to a vehicle moving status, in this embodiment, a target in-vehicle terminal obtains fourth physical status information (i.e., the current physical status information) of a target vehicle corresponding to the target in-vehicle terminal; and then detects whether a moving status of the target vehicle indicated by the fourth physical status information satisfies a second preset rule; and when the moving status of the target vehicle indicated by the fourth physical status information satisfies the second preset rule, removes the target node corresponding to the target in-vehicle terminal from the Internet of Vehicles. Specifically, FIG. 6 is a schematic diagram of an implementation process of exiting an Internet of Vehicles according to this embodiment of the disclosure. As shown in FIG. 6, the method includes the following operations.

At 601: the target in-vehicle terminal continuously obtains fourth physical status information (i.e., the current physical status information) of the target vehicle corresponding to the target in-vehicle terminal.

Herein, the fourth physical status information may be similar to first physical status information, or may be a part of first physical status information. For example, the fourth physical status information specifically indicates a moving direction, speed, and acceleration of the vehicle and a geographic position of the vehicle, such as a longitude and latitude. Alternatively, the fourth physical status information only indicates a moving direction, speed, acceleration, and the like of the vehicle.

At 602: whether a current speed and acceleration are greater than a preset speed threshold and acceleration threshold respectively is determined; and when the current speed is greater than the preset speed threshold and the current acceleration is greater than the preset acceleration threshold, operation 603 is executed; otherwise, operation 601 is executed.

At 603: the target in-vehicle terminal broadcasts a disconnection message to the Internet of Vehicles to which the target in-vehicle terminal connects.

At 604: the target in-vehicle terminal removes the target node corresponding to the target in-vehicle terminal from a chain structure of the Internet of Vehicles, and connects a previous node connected to the target node with a next node connected to the target node; or when the target node is a head node or a tail node, directly removes the target node corresponding to the target in-vehicle terminal.

To further enrich application scenarios of embodiments of the disclosure, when the target in-vehicle terminal is disposed in a special vehicle such as a police vehicle, a fire truck, or an ambulance, and the special vehicle enters coverage of the Internet of Vehicles, the target in-vehicle terminal can directly connect to the Internet of vehicles without determining whether a moving state of the special vehicle meets a condition, so that the in-vehicle terminal corresponding to the special vehicle performs data communication preferentially.

It can be learned from the method in the embodiments of the disclosure that, the embodiments of the disclosure can be applied to the following specific scenarios.

Scenario 1: After congestion happens in the front of a road, when a car behind drives within a broadcasting range, a vehicle behind will be reminded that there is congestion in front of the road and that the vehicle behind needs to brake or slow down, and a user can automatically make a detour in advance according to the warning information. Alternatively, when a vehicle drives into a broadcasting range of an Internet of Vehicles at a relatively high speed, it may be determined, by judging a signal strength, whether the current speed of the vehicle is excessively high, for example, relatively strong signal strength indicates that the current speed of the vehicle is excessively high, so as to remind a user to slow down or brake.

Scenario 2: Congestion happens on a road segment ahead, and specific information of congestion may be successively transmitted to each vehicle behind in a queue by using an Internet of Vehicles, that is, the vehicle behind can learn of a congestion condition. In addition, the vehicle behind can learn of a congestion cause. In this case, even there is no emergency broadcast, vehicles can perform information interaction with each other by using the Internet of vehicles.

Scenario 3: When a head node of an Internet of vehicles chain structure drives away from a congested road segment, a node located ahead can be removed from the chain structure, the entire Internet of vehicles chain structure still exists. Only information about a number of nodes needs to be updated by broadcasting a message, so that a node behind can learn of traffic generated when nodes located ahead drive away from the congested road segment within a certain period of time.

Scenario 4: When a special vehicle such as a police vehicle, a fire truck, or an ambulance approaches to a congested Internet of vehicles, the police vehicle, the fire truck, or the ambulance can be connected preferentially to the Internet of vehicles without determining a moving status of the police vehicle, the fire truck, or the ambulance. In this way, an emergency message may be preferentially broadcast to all vehicles in the entire Internet of vehicles. For example, when a police vehicle enters, from a tail or a head of a queue, a running road segment corresponding to the Internet of vehicles, a broadcast message instructs the vehicles pull over to leave an emergency lane, or informs a driver of a vehicle that there is a major accident ahead and that special emergency processing needs to be performed.

In this way, according to the embodiments of the disclosure, nearby vehicles may be communicated with each other by using an Internet of vehicles to obtain accurate congestion information when the vehicles are nearby a congestion area, without needing to combine the Internet of vehicles with the Internet. In addition, according to the embodiments of the disclosure, networking efficiency is relatively high, and a networking speed is relatively high, and the Internet of vehicles can be conveniently and flexibly updated with an actual structure change. Further, because an ad hoc network in the embodiments of the disclosure is a network with a chain structure, information and signaling transmission are simple, and the serial information transmission manner more conforms to information transmission characteristics of a congested road section.

A person skilled in the art should understand that the embodiments of the disclosure may be provided as a method, a system, or a computer program product. Therefore, the disclosure may use a form of hardware embodiments, software embodiments, or embodiments with a combination of software and hardware. Moreover, the disclosure may use a form of a computer program product that is implemented on one or more computer-usable storage media (including but not limited to a disk memory, an optical memory, and the like) that include computer-usable program code.

The disclosure is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

The above-mentioned contents are merely preferred embodiments of the disclosure, and are not used to limit the protection scope of the disclosure.

INDUSTRIAL APPLICABILITY

According to the embodiments of the disclosure, a target in-vehicle terminal obtains first physical status information of a target vehicle corresponding to the target in-vehicle terminal, and then performs an operation related to networking in a chain structure based on at least the first physical status information of the target vehicle by using the target in-vehicle terminal as a target node, so as to connect the target node to no more than two adjacent nodes. In this way, a networking structure of an Internet of Vehicles can be updated in time according to a structure change of an actual node, a networking delay is reduced, and user experience is improved. In addition, because the Internet of Vehicles in the embodiments of the disclosure has a chain structure, a network structure is relatively simple, and therefore network overheads are reduced, and networking efficiency is improved.

The invention claimed is:
1. An ad hoc networking method based on an in-vehicle terminal, comprising:
  obtaining, by a target in-vehicle terminal, first physical status information of a target vehicle corresponding to the target in-vehicle terminal, wherein the first physical status information is used for indicating at least a moving status of the target vehicle and position information of the target vehicle; and
  performing, by the target in-vehicle terminal, an operation related to networking in a chain structure based on at least the first physical status information of the target vehicle by using the target in-vehicle terminal as a target node, to connect the target node to no more than two adjacent nodes, wherein performing, by the target in-vehicle terminal, the operation related to networking in the chain structure based on at least the first physical status information of the target vehicle by using the target in-vehicle terminal as the target node comprises:
when it is determined that the moving status indicated by the first physical status information does not satisfy a first preset rule, determining, by the target in-vehicle terminal, whether a first broadcast message from an Internet of Vehicles exists; and
when the first broadcast message from the Internet of Vehicles exists, joining, by the target in-vehicle terminal, the Internet of Vehicles in the chain structure according to the first physical status information by using the target in-vehicle terminal as the target node; or
when no first broadcast message from the Internet of Vehicles exists, establishing, by the target in-vehicle terminal, the Internet of Vehicles in the chain structure based on the first physical status information by using the target in-vehicle terminal as the target node, and
wherein joining, by the target in-vehicle terminal, the Internet of Vehicles in the chain structure according to the first physical status information by using the target in-vehicle terminal as the target node comprises:
obtaining, by the target in-vehicle terminal, at least two pieces of second physical status information corresponding to the Internet of Vehicles, wherein the at least two pieces of second physical status information are used for indicating physical status information of at least two first vehicles corresponding to at least two first in-vehicle terminals in the Internet of Vehicles, respectively;
determining a first relative position relationship between the target vehicle and the at least two first vehicles according to the at least two pieces of second physical status information and the first physical status information;
determining, according to the first relative position relationship between the target vehicle and the at least two first vehicles, a target position corresponding to the target in-vehicle terminal in the Internet of Vehicles when the target in-vehicle terminal is acted as the target node, to connect the target node to no more than two target first nodes, wherein the two target first nodes are nodes, in the Internet of Vehicles, corresponding to two target first in-vehicle terminals of the at least two first in-vehicle terminals; and
joining the target node to the Internet of Vehicles according to the target position.

2. The method of claim 1, wherein connecting the target node to no more than two target first nodes comprises:
when it is determined, according to the first relative position relationship between the target vehicle and the at least two first vehicles, that the target node is a head node or a tail node in the Internet of Vehicles, controlling the target node to be connected to a target first node, so that the Internet of Vehicles to which the target node has been connected has the chain structure; or
when it is determined, according to the first relative position relationship between the target vehicle and the at least two first vehicles, that the target node is neither the head node nor the tail node in the Internet of Vehicles, controlling the target node to be connected to the two target first nodes, so that the Internet of Vehicles to which the target node has been connected has the chain structure.

3. The method of claim 1, wherein establishing, by the target in-vehicle terminal, the Internet of Vehicles in the chain structure based on the first physical status information by using the target in-vehicle terminal as the target node comprises:
receiving at least two second broadcast messages broadcast by at least two second in-vehicle terminals respectively;
obtaining at least two pieces of third physical status information from the at least two second broadcast messages respectively, the at least two pieces of third physical status information being of at least two second vehicles corresponding to the at least two second in-vehicle terminals respectively;
determining a second relative position relationship between the target vehicle and the at least two second vehicles according to the first physical status information and the at least two pieces of third physical status information; and
establishing the Internet of Vehicles according to the second relative position relationship between the target vehicle and the at least two second vehicles, to connect the target node to no more than two target second nodes, wherein the two target second nodes are nodes, in the Internet of Vehicles, corresponding to two target second in-vehicle terminals of the at least two second in-vehicle terminals.

4. The method of claim 3, wherein connecting the target node to no more than two target second nodes comprises:
when it is determined, according to the second relative position relationship between the target vehicle and the at least two second vehicles, that the target node is a head node or a tail node in the established Internet of Vehicles, controlling the target node to be connected to a target second node, so that the established Internet of Vehicles has the chain structure; or
when it is determined, according to the second relative position relationship between the target vehicle and the at least two second vehicles, that the target node is neither the head node nor the tail node in the established Internet of Vehicles, controlling the target node to be connected to the two target second nodes, so that the established Internet of Vehicles has the chain structure.

5. The method of claim 1, further comprising:
obtaining, by the target in-vehicle terminal, fourth physical status information of the target vehicle corresponding to the target in-vehicle terminal; and
when a second moving status of the target vehicle indicated by the fourth physical status information satisfies a second preset rule, removing the target node corresponding to the target in-vehicle terminal from the Internet of Vehicles.

6. The method of claim 1, further comprising:
obtaining, by the target in-vehicle terminal, fourth physical status information of the target vehicle corresponding to the target in-vehicle terminal; and
when a second moving status of the target vehicle indicated by the fourth physical status information satisfies a second preset rule, removing the target node corresponding to the target in-vehicle terminal from the Internet of Vehicles.

7. An in-vehicle terminal, comprising a processor and a memory storing computer-readable operation instructions, wherein when the computer-readable operation instructions in the memory are run, the processor is configured to:

obtain first physical status information of a target vehicle corresponding to a target in-vehicle terminal, wherein the first physical status information is used for indicating at least a moving status of the target vehicle and position information of the target vehicle; and perform an operation related to networking in a chain structure based on at least the first physical status information of the target vehicle by using the target in-vehicle terminal as a target node, to connect the target node to no more than two adjacent nodes, wherein the processor is further configured to:

when it is determined that the moving status indicated by the first physical status information does not satisfy a first preset rule, determine, by the target in-vehicle terminal, whether a first broadcast message from an Internet of Vehicles exists; and when the first broadcast message from the Internet of Vehicles exists, join, by the target in-vehicle terminal, the Internet of Vehicles in the chain structure according to the first physical status information by using the target in-vehicle terminal as the target node; or when no first broadcast message from the Internet of Vehicles exists, establish, by the target in-vehicle terminal, the Internet of Vehicles in the chain structure based on the first physical status information by using the target in-vehicle terminal as the target node, and wherein the processor is further configured to:

obtain at least two pieces of second physical status information corresponding to the Internet of Vehicles, wherein the at least two pieces of second physical status information are used for indicating physical status information of at least two first vehicles corresponding to at least two first in-vehicle terminals in the Internet of Vehicles, respectively;

determine a first relative position relationship between the target vehicle and the at least two first vehicles according to the at least two pieces of second physical status information and the first physical status information;

determine, according to the first relative position relationship between the target vehicle and the at least two first vehicles, a target location corresponding to the target in-vehicle terminal in the Internet of Vehicles when the target in-vehicle terminal is acted as the target node, to connect the target node to no more than two target first nodes, wherein the two target first nodes are nodes, in the Internet of Vehicles, corresponding to two target first in-vehicle terminals of the at least two first in-vehicle terminals; and join the target node to the Internet of Vehicles according to the target position.

8. The in-vehicle terminal of claim 7, wherein the processor is further configured to:

when it is determined, according to the first relative position relationship between the target vehicle and the at least two first vehicles, that the target node is a head node or a tail node in the Internet of Vehicles, control the target node to be connected to a target first node, so that the Internet of Vehicles to which the target node has been connected has the chain structure; or when it is determined, according to the first relative position relationship between the target vehicle and the at least two first vehicles, that the target node is neither the head node nor the tail node in the Internet of Vehicles, control the target node to be connected to the two target first nodes, so that the Internet of Vehicles to which the target node has been connected has the chain structure.

9. The in-vehicle terminal of claim 7, wherein the processor is further configured to:

receive at least two second broadcast messages broadcast by at least two second in-vehicle terminals respectively;

obtain at least two pieces of third physical status information from the at least two second broadcast messages respectively, the at least two pieces of third physical status information being of at least two second vehicles corresponding to the at least two second in-vehicle terminals respectively;

determine a second relative position relationship between the target vehicle and the at least two second vehicles according to the first physical status information and the at least two pieces of third physical status information; and establish the Internet of Vehicles according to the second relative position relationship between the target vehicle and the at least two second vehicles, to connect the target node to no more than two target second nodes, wherein the two target second nodes are nodes, in the Internet of Vehicles, corresponding to two target second in-vehicle terminals of the at least two second in-vehicle terminals.

10. The in-vehicle terminal of claim 9, wherein the processor is further configured to:

when it is determined, according to the second relative position relationship between the target vehicle and the at least two second vehicles, that the target node is a head node or a tail node in the established Internet of Vehicles, control the target node to be connected to a target second node, so that the established Internet of Vehicles has the chain structure; or when it is determined, according to the second relative position relationship between the target vehicle and the at least two second vehicles, that the target node is neither the head node nor the tail node in the established Internet of Vehicles, control the target node to be connected to the two target second nodes, so that the established Internet of Vehicles has the chain structure.

11. The in-vehicle terminal of claim 7, wherein the processor is further configured to:

obtain fourth physical status information of the target vehicle corresponding to the target in-vehicle terminal; and when a second moving status of the target vehicle indicated by the fourth physical status information satisfies a second preset rule, remove the target node corresponding to the target in-vehicle terminal from the Internet of Vehicles.

12. The in-vehicle terminal of claim 7, wherein the processor is further configured to:

obtain fourth physical status information of the target vehicle corresponding to the target in-vehicle terminal; and when a second moving status of the target vehicle indicated by the fourth physical status information satisfies a second preset rule, remove the target node corresponding to the target in-vehicle terminal from the Internet of Vehicles.

13. A non-transitory computer storage medium, wherein the non-transitory computer storage medium stores a computer program, and the computer program is used for:

obtaining first physical status information of a target vehicle corresponding to a target in-vehicle terminal, wherein the first physical status information is used for indicating at least a moving status of the target vehicle and position information of the target vehicle; and performing an operation related to networking in a chain structure based on at least the first physical status information of the target vehicle by using the target in-vehicle terminal as a target node, to connect the target node to no more than two adjacent nodes, and wherein performing the operation related to networking in the chain structure based on at least the first physical status information of the target vehicle by using the target in-vehicle terminal as the target node comprises:

when it is determined that the moving status indicated by the first physical status information does not satisfy a first preset rule, determining, by the target in-vehicle terminal, whether a first broadcast message from an Internet of Vehicles exists; and when the first broadcast message from the Internet of Vehicles exists, joining, by the target in-vehicle terminal, the Internet of Vehicles in the chain structure according to the first physical status information by using the target in-vehicle terminal as the target node; or when no first broadcast message from the Internet of Vehicles exists, establishing, by the target in-vehicle terminal, the Internet of Vehicles in the chain structure based on the first physical status information by using the target in-vehicle terminal as the target node, and wherein joining, by the target in-vehicle terminal, the Internet of Vehicles in the chain structure according to the first physical status information by using the target in-vehicle terminal as the target node comprises:

obtaining, by the target in-vehicle terminal, at least two pieces of second physical status information corresponding to the Internet of Vehicles, wherein the at least two pieces of second physical status information are used for indicating physical status information of at least two first vehicles corresponding to at least two first in-vehicle terminals in the Internet of Vehicles, respectively;

determining a first relative position relationship between the target vehicle and the at least two first vehicles according to the at least two pieces of second physical status information and the first physical status information;

determining, according to the first relative position relationship between the target vehicle and the at least two first vehicles, a target position corresponding to the target in-vehicle terminal in the Internet of Vehicles when the target in-vehicle terminal is acted as the target node, to connect the target node to no more than two target first nodes, wherein the two target first nodes are nodes, in the Internet of Vehicles, corresponding to two target first in-vehicle terminals of the at least two first in-vehicle terminals; and joining the target node to the Internet of Vehicles according to the target position.

14. The non-transitory computer storage medium of claim 6, wherein connecting the target node to no more than two target first nodes comprises:

when it is determined, according to the first relative position relationship between the target vehicle and the at least two first vehicles, that the target node is a head node or a tail node in the Internet of Vehicles, controlling the target node to be connected to a target first node, so that the Internet of Vehicles to which the target node has been connected has the chain structure; or when it is determined, according to the first relative position relationship between the target vehicle and the at least two first vehicles, that the target node is neither the head node nor the tail node in the Internet of Vehicles, controlling the target node to be connected to the two target first nodes, so that the Internet of Vehicles to which the target node has been connected has the chain structure.

* * * * *